May 27, 1969
P. L. MAY ET AL
3,446,369
AUTOMATIC BALE WAGON
Filed Aug. 28, 1967
Sheet 1 of 4
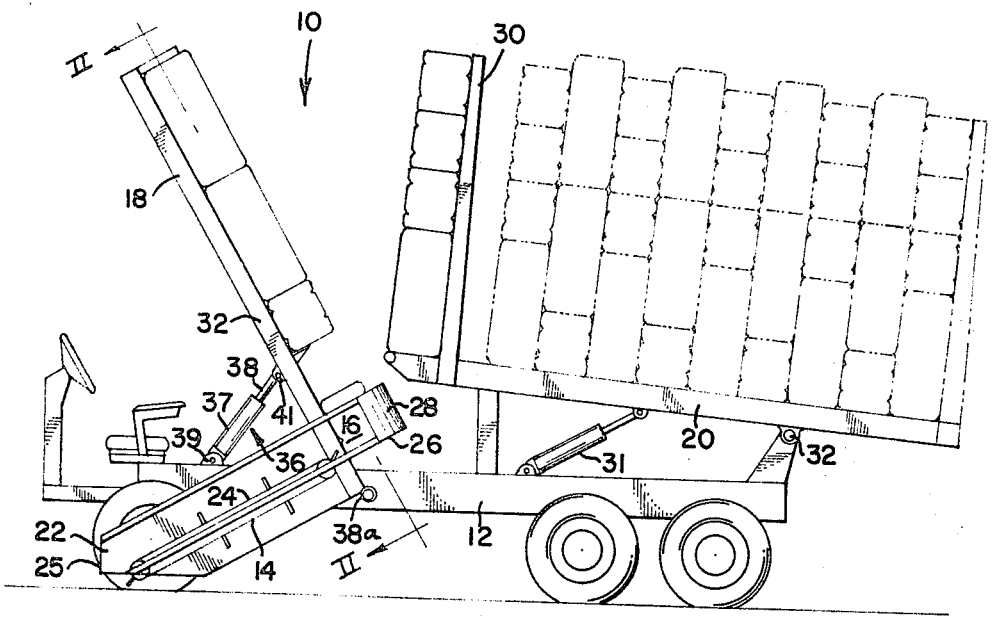
FIG. 1
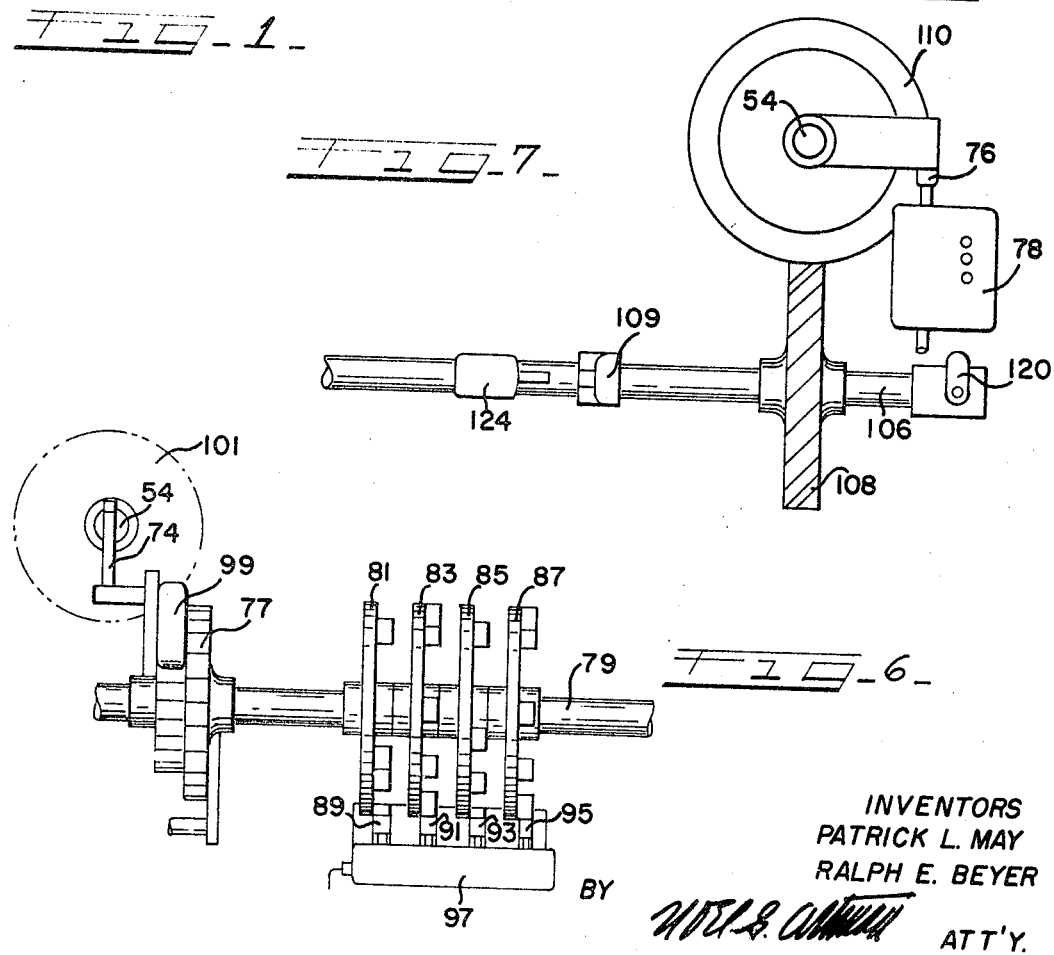
FIG. 7
FIG. 6
INVENTORS
PATRICK L. MAY
RALPH E. BEYER
BY
ATT'Y.

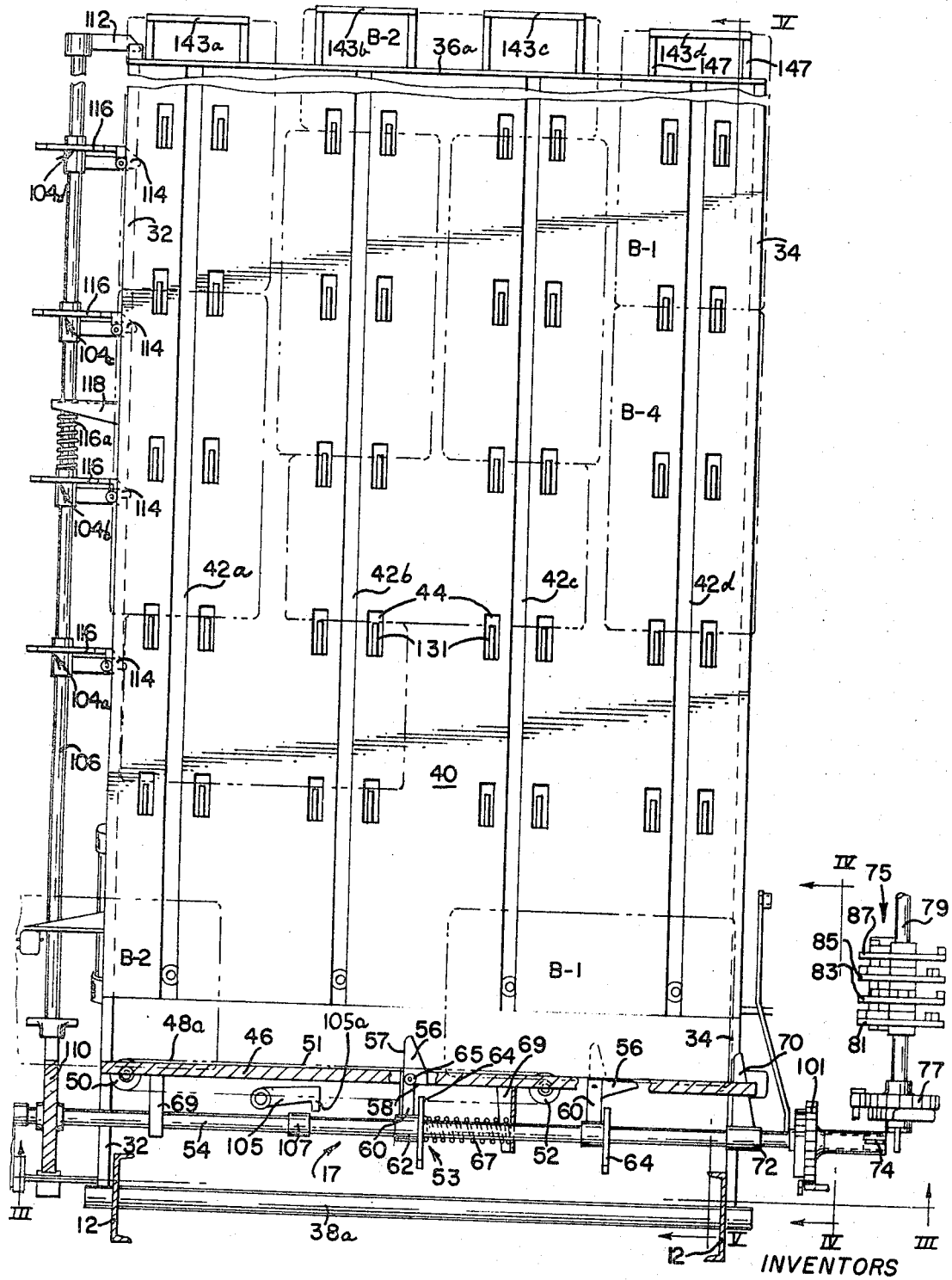

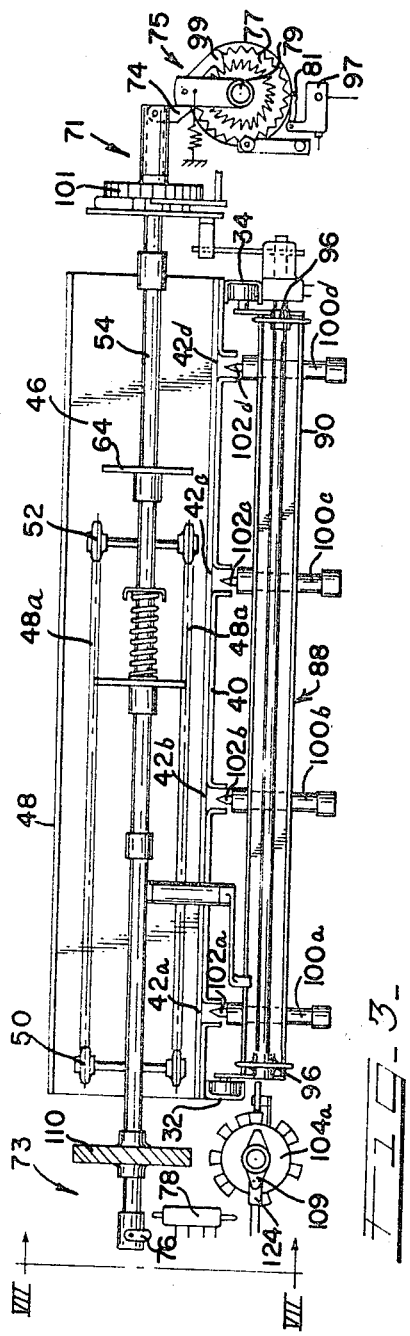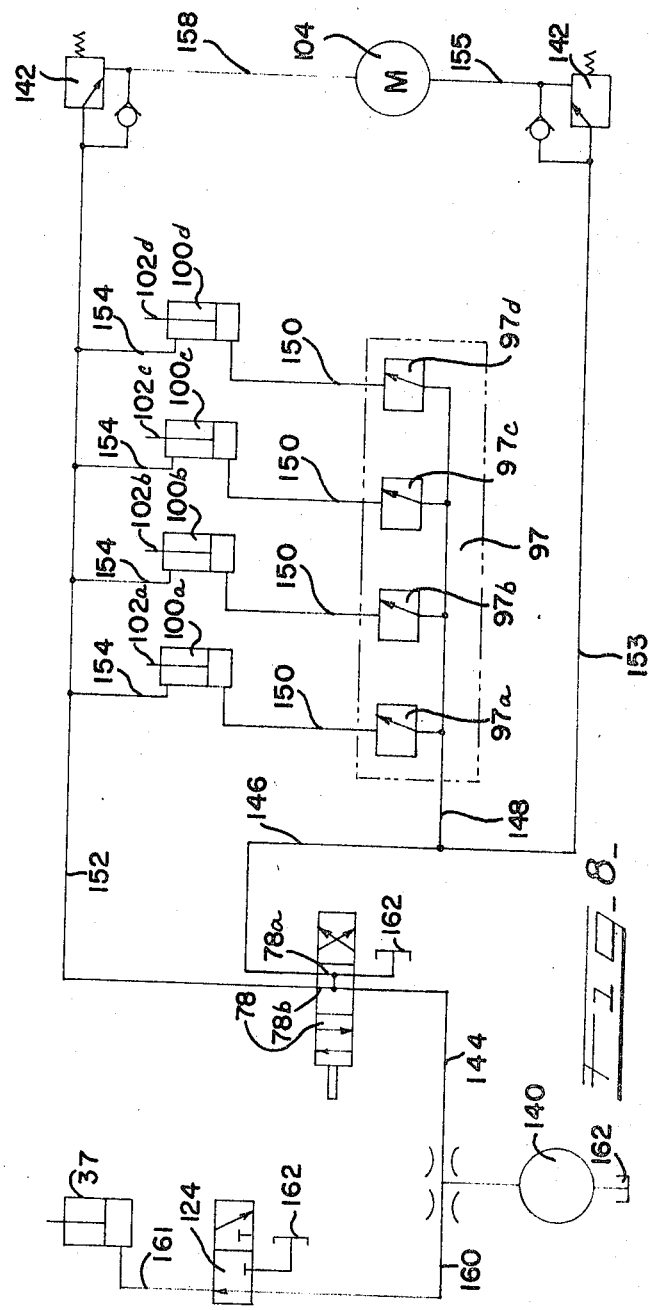

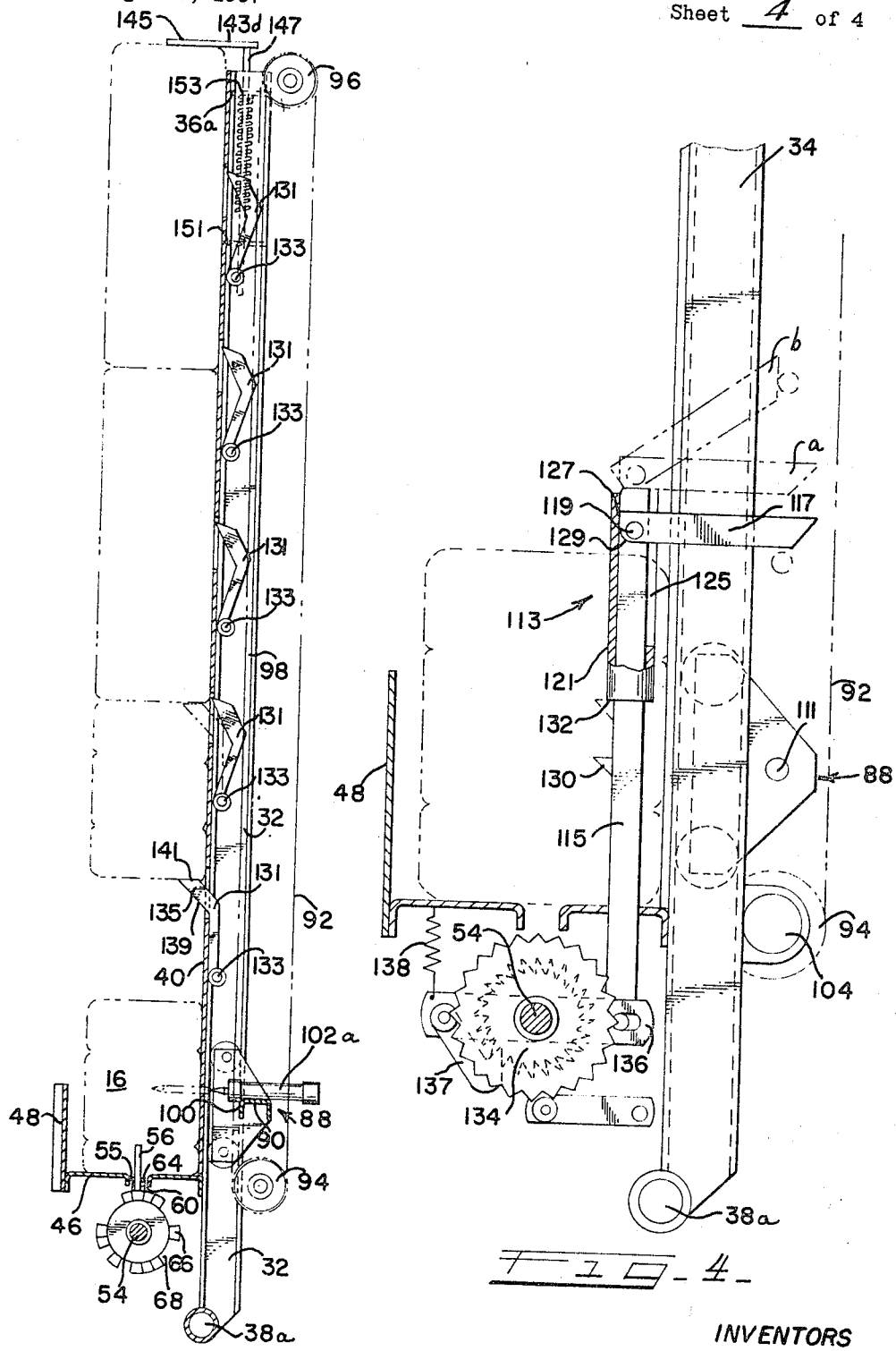

United States Patent Office 3,446,369
Patented May 27, 1969

3,446,369
AUTOMATIC BALE WAGON
Patrick L. May and Ralph E. Beyer, Memphis, Tenn., assignors to International Harvester Company, Chicago, Ill., a corporation of Delaware
Filed Aug. 28, 1967, Ser. No. 663,860
Int. Cl. B65g 57/28, 25/08
U.S. Cl. 214—6
13 Claims

ABSTRACT OF THE DISCLOSURE

A self-propelled bale wagon having a stack-forming and a stack-receiving bed for arranging and accumulating bales in an interlocked pattern. The stack-forming bed includes elevating means having bale penetrating spikes for moving bales therealong and spring-loaded retainers for maintaining the position of the bales on the stack-forming bed. The bale wagon components are operated by a hydraulic system controlled by mechanical indexers. The indexers provide automatic means for accumulating bales in a predetermined, interlocked pattern.

BACKGROUND OF THE INVENTION

The present invention relates to automatic bale wagons and more particularly to automatic bale wagons having bale stacking means that accumulate bales in an interlocked pattern.

The presently known automatic bale wagons accumulate bales in a non-interlocked pattern. The stacking mechanism of these machines function according to a single stacking sequence, which inherently precludes stacking the bales in a complete interlocked pattern.

Interlocking or cross-tieing of bales adds greatly to the stability of a stack because of the self-sustaining characteristics gained from such a pattern. In hauling bales cross country, it is imperative that the bales be stacked according to an interlocked pattern. Therefore, if the automatic bale wagon is not equipped with facilities to accumulate bales according to such a pattern, the bales must be restacked to place them in a condition for hauling. Thus it is obvious that the utility of a bale wagon which accumulates bales in a non-interlocked pattern is restricted to field use.

SUMMARY

The present invention employs a novel stacking mechanism that forms stacks of bales according to a variable stacking sequence. By varying the sequence for alternate stacks, the bales of one stack can be arranged in an interlocked relationship with those of an adjacent stack. To promote this end, the stacking mechanism is provided with bale positioning means independently operable upon a single bale. Selective operation of the bale positioning means determines the final disposition of the bale on the stacking mechanism. By controlling the operation according to a predetermined sequence, a stack of bales may be formed in the desired pattern.

Briefly, the objects of the present invention are:

(1) to accumulate bales in a condtion for hauling;
(2) to provide a stacking mechanism operable according to a variable stacking sequence;
(3) to provide a stacking mechanism adapted to accumulate bales in an interlocked pattern;
(4) to provide automatic controls for regulating the operation.

These and other objects will become apparent to those skilled in the art as the disclosure is made in the following description of a preferred embodiment.

DRAWINGS

FIGURE 1 is a side elevation of a bale wagon constructed in accordance with the principles of the present invention;

FIGURE 2 is an enlarged view, partially in section, taken along line II—II of FIGURE 1 and depicting details of the stacking mechanism used in the bale wagon;

FIGURE 3 is a bottom view of the stacking mechanism taken generally along line III—III of FIGURE 2;

FIGURE 4 is a fragmentary side view of the stacking mechanism taken generally along line IV—IV of FIGURE 2;

FIGURE 5 is a sectional view taken generally along line V—V of FIGURE 2;

FIGURE 6 is a fragmentary top view of the selector valve indexer used in the stacking mechanism shown in FIGURES 1 and 2;

FIGURE 7 is a simplified fragmentary view taken generally along line VII—VII of FIGURE 3 showing the relationship of the primary and secondary shafts, and FIGURE 8 is a schematic illustrating the hydraulic system used in the bale wagon shown in FIGURE 1.

DESCRIPTION

General

As shown in FIGURE 1, a bale wagon 10 constructed in accordance with the principles of the present invention includes generally a wheel-mounted chassis 12 which carries the components of the bale wagon. The principal components are: A side-mounted elevator 14, a transverse bale chute 16, a stacking bed 18, and a stack-receiving bed 20. As this invention is primarily concerned with the stacking means (chute 16 and stack-forming bed 18), the other components will be described only generally to indicate the environment in which the stacking means function.

The elevator 14 comprises a bale guide frame 22 and an endless chain 24 mounted thereon and has a lower end 25 disposed adjacent the ground for receiving bales therethrough and an upper end 26 disposed opposite chute 16 for depositing bales thereon. A deflector 28 mounted on elevator end 26 serves to guide the bales onto chute 16.

The stack-receiving bed 20 has an upwardly extending carriage 30 normally positioned at the front end of the bed 20 (solid line position of FIGURE 1) receiving stacks of bales delivered by the stacking bed 18. The carriage 30 is movable along and toward the rear of the bed 20 (broken line position of FIGURE 1) as successive stacks are deposited on the front end of bed 20.

Upon accumulating a complete load of bales, the bale wagon 10 is driven to a central storage area where the load is deposited on the ground. A hydraulic ram 31 pivots the bed 20 about pivot point 32 upending the load of bales. Thus it will be appreciated that vertical stacks of bales on the bed 20 become horizontal layers of the stack on the ground.

According to the present invention the bales will be arranged and accumulated in an interlocked pattern. Interlocking describes the pattern wherein vertically adjacent bales are disposed with their respective axes in a rectangular relationship. An interlocked pattern can be obtained only when the stacking mechanism forms a layer distinct from a succeeding layer. The present invention contemplates the formation of alternating and distinctive layers by means of a novel stacking mechanism.

The novel stacking mechanism may be best described by considering the individual component: (1) bale stacking bed, (2) bale chute, (3) transfer mechanism, (4) elevating mechanism, and (5) hydraulic system.

Bale stacking bed (FIGURES 1 and 2)

The bale stacking bed 18 includes a rectangular frame structure having a pair of spaced and inwardly facing channel members 32 and 34 interconnected at one end by a cross member 36a and at the other end by a rockshaft 38a. The rockshaft 38 is journalled to the chassis 12 so that the frame is pivotable about a transverse and horizontal axis. The bed 18 is pivotable between a normally tilted position (solid line position of FIGURE 1) and a vertical stack delivering position by means of a hydraulic ram 37. The ram 37 has a cylinder 36 attached to chassis 12 as at 39 and a piston rod 38 attached to the underside of channel member 32 as at 41.

In the normal tilted position the bed has an upwardly facing side adapted to accumulate a layer of bales thereon. The upwardly facing side of the bed frame is closed by a sheet metal plate 40 which constitutes the bale supporting surface of the stack-forming bed 18. A plurality of elongate slots, designated as 42a, 42b, 42c and 42d, extend longitudinally along the plate 40 and a plurality of rectangular slots each designated as 44 flank the elongate slots at longitudinal intervals. The elongate slots 42a–42d are laterally spaced at approximately one-half bale length intervals. The rectangular slots 44 associated with each of the elongate slots 42a–42d are spaced longitudinally on bed 18 and are aligned laterally with similarly spaced slots of the other elongate slots. The elongate slots 42a–42d and the rectangular slots 44 accommodate the elevating and retaining means to be discussed presently.

Bale chute (FIGURES 1, 2 and 5)

The bale chute 16 comprises a side wall 48 and a floor 46 disposed in rectangular relationship with the stacking bed 18. The side wall 48 is supported by the floor 46 and is disposed parallel and spaced from plate 40. The space between the side wall 48 and a lower portion of plate 40, bottomed by floor 46, thus constitutes the bale chute 16. Chute 16 has an open end aligned with upper end 26 of elevator 14 for receiving bales delivered by the elevator 14.

Transfer mechanism (FIGURES 2, 3, 5 and 6)

In order to properly position a bale in chute 16, a transfer mechanism 17 is provided. The transfer mechanism 17 includes a pair of chains 48a, 48a trained over sprocket assemblies 50 and 52. The chains 48a, 48a have upper runs 51, 51 arranged in parallel and laterally spaced on floor 46. The sprockets 50 and 52 are longitudinally spaced on floor 46 so that upper runs 51 extend from the bale receiving end of bale chute 16 to a point less than one bale length from the opposite end of the bale chute 16. Sprocket assembly 50 may be continuously driven by any suitable means.

A bale-stop assembly designated generally as 53 limits the bale movement through chute 16. The function of the bale stop assembly 53 is: (1) to position a bale in chute 16, (2) to actuate the transfer mechanism indexer, and (3) to actuate the hydraulic controls (Items (2) and (3) are discussed in detail below).

A primary shaft 54 journalled in brackets 69, 69 and extending below the platform 46 carries a pair of axially-spaced intermediate stop-levers 56, 56 which normally protrude through an elongate slot 55 formed in floor 46. Each lever 56 is L-shaped having a leg 57 which extends through slot 55 into chute 16, and a horizontal leg 58 disposed above and parallel to the primary shaft 54. Each lever 56 is pivotally connected to an upright connector 60 attached to a hub 62. The hub 62 is journalled on shaft 54 but is movable axially therewith. As best seen in FIGURE 5, a top portion of the connector 60 is closely fit in slot 55, thereby maintaining the stop and connector assembly in an erect position. A torsion spring 64 concentrically mounted on pin 65 biases the lever 54 in an upright position wherein leg 57 is disposed in the line of bale movement and leg 58 is disposed parallel to primary shaft 54.

Positioned under horizontal leg 58 and secured to the primary shaft 54 is a stop cam 64. The hub 62 abuts the cam 64 so that axial movement of either is translated to the other. The stop cam 64 is thus movable axially and rotatably with the primary shaft 54, whereas the hub 62 and stop assembly is movable axially therewith. The stop cam 64 has formed therein a plurality of cam lobes 66 separated by peripheral grooves 68. When the grooves 68 underlie horizontal leg 58, the lever 56 is permitted to pivot about pin 65 as a bale engages upright leg 57; and when one of the lobes 66 is positioned directly under leg 58, the stop lever 56 is prevented from pivoting and thereby serves as a means for imparting axial movement to shaft 54 in response to bale movement through chute 16.

A coil spring 67 concentrically mounted on primary shaft 54 and disposed between cam 64 and support 69 urges the shaft 54 in its home position.

Thus it will be appreciated that the primary shaft 54 is movable axially and is rotatable. Disposed in the line of bale movement and at the outer extremity of floor 46 is a permanent stop 70 attached to a hub 72. As are intermediate bale stops 56, 56, permanent stop 70 is free wheeling on shaft 54 but movable axially therewith.

As shown in FIGURE 3, both ends of the primary shaft 54 extend beyond the longitudinal extent of floor 46. These extensions, designated as 71 and 73, carry the control means for effecting the sequential operation of the stacking mechanism.

More specifically, the outer extremity of extension 71 has a cam lobe 74 depending therefrom. Cam lobe 74 is aligned to actuate a selector valve indexer 75 as shaft 54 moves axially to the right as viewed in FIGURES 2 and 3.

The selector valve indexer 75 includes a ratchet assembly 77 mounted on a shaft 79 which is journalled to chassis 12 by any suitable means. Rotation of the ratchet assembly 77 positions four axially aligned cams 81, 83, 85 and 87 (also mounted on shaft 79) which respectively engage cam followers 89, 91, 93 and 95 (see FIGURE 6). Each of the cam followers 89, 91, 93 and 95 are adapted to actuate a selector valve 97 of the hydraulic system. Thus, movement of the ratchet assembly 77 one index notch by a pawl 99 in response to axial movement of shaft 54 positions the cams 81, 83, 85 and 87 to selectively actuate selector valve 97.

The primary shaft 54 is rotated in index increments to position the cams 64, 64 under their corresponding levers 56, 56. Rotation in increments is provided by a primary shaft indexer 101 mounted on extension 71. The primary shaft indexer 101 is actuably responsive to movement of bale elevating means discussed below.

In order to prevent premature axial movement of primary shaft 54, a sequence stop 105 hinged to the underside of floor 46 cooperates with a collar 107 mounted on shaft 54 (see FIGURE 2). Sequence stop 105 has a latch, 105a adapted to engage a shoulder of collar 107. The latch 105a is movable between latched and unlatched positions in response to the position of the elevating means to be discussed presently.

Returning to FIGURE 3 extension 73 has depending therefrom a cam lobe 76 aligned to actuate a four-way valve 78 of the hydraulic system.

The return spring 67, cam lobe 74, and cam lobe 76 are particularly positioned on primary shaft 54 to effect the following sequence of operation in one axial stroke of the primary shaft 54: first, cam lobe 74 actuates indexer 75; second, return spring 67 is depressed; and third, cam lobe 76 actuates the four-way valve 78. The significance of this particular sequence is discussed in detail under *hydraulic system*.

Elevator mechanism (FIGURES 2, 3, 4, 5 and 7)

The bales are elevated from the floor 46 to the desired position on stack-forming bed 18 by means of a spike carriage 88. The carriage 88 includes a horizontal channel member 90 rollably mounted in channel members 32 and 34. The carriage 88 is movable along the underside of plate 40 by means of an endless chain 92. Chain 92 is trained over a lower drive sprocket 94 and an upper sprocket 96 and has a run 98 attached to channel member 90 as at 100. Equidistantly spaced along channel member 90 and carried thereby are four hydraulic cylinders 100a, 100b, 100c and 100d. The hydraulic cylinders 100a–100d, respectively, have spikes, denoted as 102a, 102b, 102c and 102d, which are telescopically movable in their respective cylinders. In the projected position as shown in FIGURE 5 (dotted line position) the spikes 102a, 102b, 102c and 102d are respectively aligned with slots 42a, 42b, 42c and 42d formed in plate 40. In the lower position of the carriage 88 the spikes 102a–102d are disposed approximately one-half bale width above chute floor 46. As is discussed in detail below, the spikes 102a–102d are adapted to project into bale chamber 16 to penetratingly engage bales accommodated therein. Upward movement of the carriage structure 88 by means of a hydraulic motor 104 (FIGURE 4) geared to drive sprocket 94 thus elevates the bale along bed 18.

Extending adjacent the channel member 32 and spaced laterally therefrom is a secondary stop shaft 106 (FIGURE 2). The secondary stop shaft 106 is rotatable by means of intermeshing index gears 108 and 110 respectively mounted on the lower end of shaft 106 and the extension 73 of shaft 54 as viewed in FIGURE 7. The secondary shaft 106 is also movable axially by means of a plurality of stop assemblies 104a, 104b, 104c, 104d and 112 spaced along shaft 106. The intermediate stop assemblies 104a–104d are identical to those mounted on the primary shaft 54, each having a pivotable lever 114 disposed in the path of carriage movement and a cooperatively arranged cam 116. The cam 116 has cam lobes to permit pivotal movement of the lever 14 and cam grooves to permit pivotal movement thereof. A secondary stop shaft return spring 116a separates stop assembly 104b and a stop bracket 118 attached to longitudinal channel member 32. At the lower end of secondary shaft 106 is a cam lobe 120 (see FIGURE 7) aligned to actuate the four-way valve 78. A cam lobe 109 disposed on an intermediate portion of secondary shaft 106 is aligned to engage and actuate a three-way valve 124 as shaft 106 moves axially. As is discussed in more detail later, the three-way valve 124 diverts hydraulic fluid flow to the lift cylinder 37.

Referring now to FIGURE 4, the primary shaft indexer 101 will be described. The carriage 88 has a laterally projecting lug 111 extending parallel to extension 71 which serves to actuate indexer actuator 113 which changes the positions of the primary and secondary shaft stop assemblies. The actuator 113 includes a pair of linkages 115 and 117 hinged together as at 119. Linkage 115 is slidably mounted in a sleeve 121 which is secured to channel member 34 by any suitable means. The sleeve 121 has formed therein a longitudinally extending slot 125 to permit the passage of linkage 117 as the linkage 115 is reciprocated in the sleeve 121. The hinged end as at 119 of linkage 117 has a straight edge 127 adapted to abut the inner surface of sleeve 121 to prevent upward pivoting of linkage 117 within the confines of sleeve 121. A rounded corner 129 below the straight edge 127 permits the linkage 117 to pivot downwardly about hinged point 119. The linkage 117 normally extends perpendicular from linkage 115 across the path of movement of lug 111. The perpendicular relationship of the linkage 115 and 117 may be maintained by any suitable biasing means such as a torsion spring.

The upward movement of linkage 115 in sleeve 121 is limited by a lug 130 projecting outwardly from linkage 115 and adapted to engage a bottom edge 132 of sleeve 121.

The primary shaft indexer 101 includes a ratchet 134 mounted on shaft 54 which is actuable by a pawl 137, connected to the linkage 115 by arm 136. Arm 136 is pivotable about shaft 54 so that upward movement of linkage 115 moves the pawl 137 counterclockwise (as viewed in FIGURE 4) to the next index position. Return spring 138 maintains the pawl and linkages in the home position. Thus as the carriage 88 moves upwardly along the underside of plate 40 the lug 111 first encounters linkage 117. The lug 111 moves the linkages 115 and 117 rectilinearly upwardly to the broken-line position a of FIGURE 4. In this position lug 130 stoppingly engages edge 132 of sleeve 121 and linkage 117 has cleared the confinement of sleeve 121. Upward movement of linkage 115 from the solid-line position to the broken line position a has caused arm 136 to pivot about shaft 54 advancing pawl 137 one index notch on ratchet 134. Continued upward movement of carriage 88 forces linkage 117 to pivot about hinge 119 to the broken-line position b, and further upward movement clears lug 111 past linkage 117. With the force thus removed, the entire assembly is returned to the home position (solid-line position) advancing ratchet 134 one index notch. The advancement of the ratchet 134 one notch advances the primary stop cams 64, 64 and secondary stop cams 104a–104d to their next positions in the sequence of operation.

In order to maintain the bales in the elevated position on bed 18, retainers 131 are provided. The retainers 131 are each hinged to the underside of sheet 40 as at 133 (see FIGURE 5) and each has extending through slots 44 a bale engaging member 135. One retainer 131 is provided for each slot 44. The retainers 131 are biased by a torsion spring or other suitable means so that the bale engaging member 135 projects through slot 44 and outwardly from the plane of plate 40. In the projected position member 135 has one edge 139 arranged obliquely with plate 40 and another edge 141 arranged perpendicularly thereto. As a bale is carried upwardly on plate 40, the bale engages edge 139, depressing retainer 131 into slot 44. As the bale clears slot 44 the torsion spring returns the retainer 131 to the projected position wherein edge 141 supportingly engages the bale. Note that the tilt of the bed 18 in its home position permits the extent of the projection to be only a short distance, the retainer 131 serving as a stop for the bale resting on the bed 18.

Bale tension devices 143a, 143b, 143c and 143d, disposed respectively in alignment with elongate slots 42a, 42b, 42c and 42d (FIGURE 2) serve to maintain a slight compressive force on the bales accommodated on bed 18. The tension devices 143a–143d are identical, each having a bale-engaging member 145 extending perpendicularly from plate 40. The bale-engaging member 145 is secured to a pair of shafts 147, 147 which extend parallel to their corresponding slots. As shown in FIGURE 5 an upper portion of each shaft 147 extends through an aperture 153 formed in cross-member 36a, and a lower portion is supported by a second cross member 151, it being understood that shafts 147, 147 are movable axially within their supports. A coil spring 155 concentrically mounted on shaft 147 maintains the tension device in its home position wherein the bale engaging member 145 rests on upper transverse edge of plate 40.

Hydraulic system (FIGURE 8)

As indicated above, the hydraulic system includes the selector valve 97, the four-way valve 78, the three-way valve 124, the tilt cylinder 37, the spike cylinders 100a, 100b, 100c, 100d, and the hydraulic motor 104. The hydraulic system further includes a pump 140 fed by reservoir 162 and time delay valves 142, 142.

The circuitry for moving the spikes out of their respective cylinders is as follows: line 144, passage 78a of valve 78, line 146, line 148, selector valve 97, line 150. The selector valve 97 includes selectively operable valves 97a, 97b, 97c and 97d for actuating cylinders 100a, 100b, 100c and 100d, respectively. The cylinders 100a–100d are actuated according to the position of cams 81, 83, 85 and 87 (see FIGURE 6). Thus by selectively operating valves 97a–97d, the spikes 102a–102d may be projected to the bale penetrating position individually or in combination.

The circuitry for retracting the spikes 102a–102d into their respective cylinders 100a–100d includes line 144, passage 78b of valve 78, line 152 and line 154.

The circuitry for driving the carriage motor 104 in the direction to elevate carriage 88 is as follows: line 144, passage 78a, line 146, line 153, time delay valve 142, line 155, and motor 104. The carriage 88 is lowered by reversing the motor 104 by the following circuit: line 144, passage 78b, line 152, time delay 142, line 158 and motor 104. Actuation of the four-way valve 78 alternately opens and closes passages 78a and 78b. When passage 78a is open, passage 78b is in communication with reservoir 162. Similarly, passage 78a is in communication with reservoir 162 with passage 78b in the open position.

The hydraulic circuitry for energizing lift ram 37 includes line 160, three-way valve 124, line 161, and cylinder 37. The cylinder 37 may be single-acting, having biasing means for returning the ram to its home position upon deenergization of the circuit.

OPERATION

In describing the operation let it be assumed that a first bale B–1 has been delivered to chute 16 by elevator 14 as shown in FIGURE 1, and let it further be assumed that the contemplated bale pattern will be that depicted in FIGURE 2. Thus the route of bale B–1 will be laterally across floor 46 to stop 70, thence upwardly along bed 18 to the position shown.

In the home positions of the transfer and elevating mechanisms, carriage 88 rest on sequence stop 105 holding latch 105a in its unlatched position. As bale B–1 is moved across floor 46 by chains 48a, 48a, its front end engages and depresses intermediate stops 56, 56 (groove 68 of cams 60 being aligned with leg 58). The bale B–1 moves through chute 16 until its front end engages permanent stop 70. Continued bale movement shifts the primary shaft 54 axially to the right as viewed in FIGURE 3. Initial axial movement of shaft 54 causes cam lobe 74 to actuate the selective valve indexer 75 which selectively opens passage 97d of selector valve 97 (see FIGURE 8). Further axial movement of shaft 54 depresses return spring 67. Near the end of the axial stroke of shaft 54 the four-way valve 78 is actuated by the cam lobe 76. This opens passage 78a of the four-way valve 78, energizing the spike cylinder circuit. Hydraulic flow is directed through passage 97d to cylinder 100d extending spike 102d to its projected position. The spike 102d thus projects through slot 42d into chute 16 and penetratingly engages bale B–1 which has a side confronting cylinder 100d. The spike 102d enters the bale B–1 at about the center of the forward half of the side confronting cylinder 100d. The time delay 142 delays energization of carriage motor 104 until the spike 102d has had sufficient time to engage bale B–1. Hydraulic flow of the motor 104 drives the chain 92 clockwise as viewed in FIGURE 5, moving the carriage 88 upwardly along bed 18. Upward movement of carriage 88 with the spike 102d imbedded in a forward section of bale B–1 causes it to pivot about spike 102d. The bale is thusly pivoted 90° as the carriage 88 carries it from chute 16 onto plate 40 of bed 18.

Upward movement of carriage 88 effects the following sequence of operation:

(1) Primary shaft 54 is returned to its home position;
(2) The sequence stop 105 is moved to the latched position;
(3) The primary shaft indexer 101 is advanced one notch;
(4) The tension device 143d is depressed;
(5) The retainers 131 are moved to supportingly engage bale B–1.

When bale B–1 clears stops 70, spring 67 returns primary shaft 54 to its home position. As the carriage moves away from the sequence stop 105, latch 105a engages collar 107 to prevent premature axial movement of the primary shaft 54 by a succeeding bale. Continued upward movement of carriage 88 causes lug 111 to engage linkage 117 of the indexer actuator 113, advancing the primary shaft indexer 101 one notch. The indexer 101 positions the cams 64 under the stops 56 according to the program sequence. In the present example, cam lobe 66 is placed under leg 58 of the middle stop 56. The secondary shaft 106 is also advanced through gears 108 and 110 to the position wherein the intermediate stops 104a–104d are aligned with grooves in their corresponding cams 116.

The carriage 88 elevates the bale B–1 to the upper extremity of bed 18, the bale B–1 depressing retainers 131 as it moves across slots 44; and channel member 90 depresses intermediate secondary stops 104a–104d as it moves therepast.

As the carriage 88 approaches the upper extremity of its stroke, the bale B–1 engages bale tension device 143d compressing spring 155 (see FIGURE 5). Bale B–1 then clears slots 44 permitting retainers 131 to project to their supporting position. Now the channel member 90 engages permanent stops 112 at the upper extremity of the secondary shaft 106 moving the secondary shaft 106 axially upwardly as viewed in FIGURE 2. This causes cam lobe 120 to actuate the four-way valve 78 opening passage 78b and turning passage 78a to bleed into reservoir 162.

Hydraulic flow through passage 78b first retracts the spike 102 from the bale B–1. The bale B–1, resting on bed 18, is now supported by retainer 131 situated thereunder. After a short time delay hydraulic flow through the return circuit reverses the direction of motor 104 returning the carriage 88 to its home position. Initial downward movement of carriage 88 disengages the channel 90 from stop 112 allowing the spring 116 to return the secondary shaft 106 to its home position.

As the carriage 88 approaches its home position, channel 90 engages and depresses sequence stop 105, moving latch 105a away from collar 107. With the carriage 88 in the home position, a pressure detent of the four-way valve 78 is actuated, placing the stacking mechanism in a condition for receiving the succeeding bale B–2.

The operation is repeated for placing bale B–2 in the position shown in FIGURE 2. Movement of the bale B–2 across chute 16 is limited by the middle stop 56 (cam 64 being indexed to prevent pivotal movement of lever 56) and spikes 102b and 102c are indexed to be actuated in this cycle. As before axial movement of shaft 54 actuates the sequencing valve 97, energizing cylinders 100b and 100c through passages 97b and 97c. The spikes 102b and 102c project into chute 16 engaging bale B–2 at longitudinally spaced points on the side of bale B–2. Now energization of motor 104 elevates the carriage 88 which carries bale B–2 along bed 18 in a horizontal orientation. At the upper extremity of bed 18 bale B–2 depresses tension devices 143b and 143c. Next the channel member 90 engages stop 112 actuating the secondary shaft 106. This energizes the return circuit, retracting spikes 102b and 102c from bale B–2 and returns the carriage 88 to its home position. Retainers 131 underlying the bale B–2 have projected to their bale supporting position and supportingly engage the underside of bale B–2.

This operation is repeated until a full layer of bales is accumulated on bed 18 in the pattern indicated. In should be noted that as a bale abuts an overlying bale, e.g. bale B–4 on bale B–1, the retainer 131 supporting the upper bale (B–1) are depressed into their corresponding slots 44 and therefore will not snag the bales as the stack is deposited on storage bed 20.

The operation for depositing the last bale B–12 on bed 18 is the same as that described above but is characterized by one additional step. After the return circuit has been energized by axial movement of secondary shaft 106, further axial movement of shaft 106 causes cam 109 to actuate the three-way valve 124. The cam 109 is shaped to actuate the valve 124 only on the cycle of the last bale. This energizes the circuit to the lift cylinder 37. The piston rod 38 is moved outwardly from the cylinder 37, pivoting bed 18 about rockshaft 38a. Pivotal movement of bed 18 from the tilted to the vertical position deposits the bales on bed 20.

The lower tier of retainers 131 are aligned to engage the front edge of bed 20. This depresses the retainers 131 into their corresponding slots 44 and thus allows the bales to expand vertically. This releases the bias force of tension 143a–143d.

It should be understood that the foregoing disclosure relates to only a preferred embodiment of the invention and that numerous modifications may be made therein without departing from the spirit and scope of the invention.

What is claimed is:

1. A bale wagon for automatically accumulating bales of hay, said wagon comprising:
   a chassis;
   a stack forming bed mounted on said chassis, said stack forming bed being movable between an inclined bale receiving position and a stack delivering position;
   a bale chute disposed transversely on said chassis and extending adjacent the lower end of said stack forming bed;
   a first transfer means for moving bales through said chute;
   a second transfer means for moving individual bales from said chute onto and along said stack forming bed;
   means responsive to said second transfer means for positioning bales on said stack forming bed in a predetermined pattern;
   retainer means for maintaining the position of bales on said bed;
   a storage bed cooperatively arranged with said stack forming bed for receiving a vertical stack of bales delivered by said stack forming bed; and
   said bed being normally inclined upwardly and away from said chute and said storage bed while said stack of bales is being formed thereon.

2. A bale wagon as recited in claim 1 wherein:
   said first transfer means includes bale-stop means for limiting longitudinal movement of bales through said chute; and
   said second transfer means includes a plurality of bale engaging elements, each of said elements being operable between a bale engaging position and a bale detached position.

3. A bale wagon as recited in claim 2 and further comprising:
   means for selectively operating said bale engaging elements, said operation being responsive to the position of the bale in said chute as determined by said bale-stop means.

4. A bale wagon as recited in claim 1 wherein said second transfer means includes:
   a carriage mounted on said stack-forming bed, said carriage extending parallel to said chute and normally positioned adjacent thereto, and being movable along said stack-forming bed from and toward said chute;
   a plurality of spike assemblies spaced along said carriage, each of said assemblies including bale penetrating spikes, said spikes being movable to an extended position wherein said spikes project into said bale chute, and a retracted position;
   means for moving said spikes to said projected position in response to the presence of a bale in said chute, and for moving said spikes to said retracted position in response to actuation of said bale positioning means.

5. A bale wagon as recited in claim 1 wherein said stack-forming bed is pivotally mounted on said chassis and pivotable between a bale receiving position and a vertical stack delivering position.

6. A bale wagon as recited in claim 1 wherein
   said stack forming bed in said bale receiving position is tilted forwardly of said chute, and
   said storage bed extends rearwardly from said stack-forming bed, said stack-forming bed being pivotable rearwardly to said stack delivering position whereby a stack of bales is deposited on said storage bed.

7. A bale wagon as recited in claim 6 wherein said retainer means include a plurality of arms, said arms being biased to protrude outwardly from said bed in a retaining position wherein said arms are adapted to engage a bottom side of said bale supported on said bed, and depressible in the direction of bale movement into said bed to permit the passage of bales thereby.

8. An apparatus for forming a stack of elongate bales, said apparatus comprising:
   a stack forming bed pivotable about a horizontal axis between an upwardly inclined bale receiving position and a vertical stack delivering position, said bed defining a stack forming zone;
   means for delivering bales adjacent one end of said stack forming bed;
   a carriage mounted on said bed and extending parallel to and normally positioned adjacent said one end of said bed, said carriage being movable away from said end along said bed to a plurality of bale delivery points thereon;
   a plurality of bale penetrating elements spaced longitudinally along said carriage, each of said elements having an operable position wherein said elements extend into said zone and an inoperable position wherein said elements are removed from said zone;
   means for moving said elements to said operative position as said carriage moves away from said one end whereby said elements extend into said zone, engage a bale opposite said carriage, and carry said bale therewith,
   means for moving said elements to said inoperative position when said carriage reaches one of said delivery points on said bed, whereby said bale is deposited on said bed,
   means for retaining said bales in said deposited positions on said bed,
   means for receiving a vertical stack of bales delivered by said stack forming bed.

9. The apparatus as recited in claim 8 and further including control means for operating said bale penetrating elements in a first combination operative upon a bale opposite said one end of said bale for transferring said bale therefrom to one of said delivery points on said bed, the bale being deposited thereon in a first deposition.
   means for operating said elements in a second combination for transferring bales from said one end of said bed to another one of said delivery points, said bales being deposited thereon in a deposition wherein the longitudinal axis of said bale is perpendicular to that of said first deposition.

10. The apparatus as recited in claim 9 and further including programming means for operating said control means in a predetermined sequence whereby bales are accumulated on said surface in a predetermined pattern.

11. A bale wagon for automatically accumulating elongate bales, said wagon comprising:
    a chassis;
    a chute disposed transversely on said chassis;
    an elevator adapted to deliver bales to said chute;
    a stack-forming bed pivotally mounted on said chassis and having one edge adjacent said chute and including a bale supporting platform sloping longitudinally, upwardly and forwardly of said chassis from said edge, said stack-forming bed being movable between said sloping position and a vertical stack delivering position;

a bale storage bed mounted on said chassis and disposed rearwardly of said stack-forming bed, said storage bed having a forward end aligned with said stack-forming bed to receive vertical stacks of bales delivered thereby;

a conveyor movable longitudinally along said platform for delivering bales from said chute onto said platform, said conveyor being capable of elevating bales from said chute to a plurality of points longitudinally spaced on said platform; and a plurality of retainers for retaining bales on said platform.

12. The bale wagon as recited in claim 11 wherein said elevating means includes a carriage movable along said platform between said chute and said longitudinal points; and a plurality of bale penetrating elements actuably movable between an extended position for transferring the bales to said platform and a retracted bale disengaging position for releasing the bales thereon.

13. The bale wagon as recited in claim 12 and further including a bale tension device extending outwardly from said platform and disposed in the path of bale movement along said platform, said tension device being yieldable in the direction of bale movement and cooperative with said retainers for maintaining a bias force upon bales deposited on said platform, means for deleasing said bias force of said tension device, said means being operatively responsive to the vertical position of said bed.

References Cited

UNITED STATES PATENTS

| | | | |
|---|---|---|---|
| 1,108,599 | 8/1914 | McCullough | 198—225 |
| 2,947,125 | 8/1960 | Wilson et al. | 214—6 X |
| 3,080,069 | 3/1963 | Euwe | 214—7 X |
| 3,159,287 | 12/1964 | Stroup | 214—6 |
| 3,272,352 | 9/1966 | Adams et al. | |
| 3,278,049 | 10/1966 | Hollyday | 214—6 |
| 3,289,859 | 12/1966 | Tarbox | 214—6 |
| 3,373,882 | 3/1968 | Forest | 214—6 |

GERALD M. FORLENZA, *Primary Examiner.*

ROBERT J. SPAR, *Assistant Examiner.*

U.S. Cl. X.R.

198—225